US012406035B2

(12) United States Patent
Mazumder et al.

(10) Patent No.: US 12,406,035 B2
(45) Date of Patent: Sep. 2, 2025

(54) SYSTEM AND METHOD FOR VALIDATING A DIGITAL ITEM TOKEN ON A SIMULATED USER DEVICE

(71) Applicant: Bank of America Corporation, Charlotte, NC (US)

(72) Inventors: Shahadat Hossain Mazumder, Charlotte, NC (US); Maneesh Kumar Sethia, Hyderabad (IN); Abhijit Behera, Hyderabad (IN); Sivashalini Sivajothi, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/240,680

(22) Filed: Aug. 31, 2023

(65) Prior Publication Data

US 2025/0077628 A1    Mar. 6, 2025

(51) Int. Cl.
| | |
|---|---|
| G06F 21/10 | (2013.01) |
| G06F 21/31 | (2013.01) |
| G06T 19/00 | (2011.01) |
| H04L 9/32 | (2006.01) |
| H04L 67/50 | (2022.01) |

(52) U.S. Cl.
CPC .......... *G06F 21/1015* (2023.08); *G06F 21/31* (2013.01); *G06T 19/003* (2013.01); *H04L 9/3213* (2013.01); *H04L 67/535* (2022.05)

(58) Field of Classification Search
CPC . H04L 9/3213; H04L 67/535; G06F 3/04815; A63F 13/352
See application file for complete search history.

(56) References Cited

U.S. PATENT DOCUMENTS

| | | |
|---|---|---|
| 4,309,569 A | 1/1982 | Merkle |
| 6,970,812 B2 | 11/2005 | Kamachi et al. |
| 7,389,269 B1 | 6/2008 | Robinson et al. |
| 7,647,243 B2 | 1/2010 | Woolston |
| 8,832,059 B2 | 9/2014 | Baran |
| 9,342,697 B1 | 5/2016 | Ren et al. |
| 9,875,510 B1 | 1/2018 | Kasper |
| 9,947,015 B1 | 4/2018 | Vildosola et al. |

(Continued)

FOREIGN PATENT DOCUMENTS

WO    WO-2023106593 A1 *  6/2023    ........... G06Q 20/065

*Primary Examiner* — Rupal Dharia
*Assistant Examiner* — Aditya Sriram

(57) ABSTRACT

The disclosure provides a method that includes presenting a simulated user device in a virtual environment, and receiving user credentials in response to an avatar interacting with the simulated user device. The method includes comparing the user credentials to known user credentials. The method includes determining that the avatar is associated with the user based on the comparison. The method includes identifying a first prior interaction from a data log of interactions, where the first prior interaction is associated with a first digital item token, and identifying a second prior interaction from the data log of interactions, where the second prior interaction is associated with a second digital item token. The method includes retrieving the first digital item token and the second digital item token, and presenting the first digital item token and the second digital item token on the simulated user device.

20 Claims, 3 Drawing Sheets

(56) References Cited

U.S. PATENT DOCUMENTS

| | | |
|---|---|---|
| 11,055,279 B2 | 7/2021 | Yan |
| 11,272,888 B1 | 3/2022 | Singh et al. |
| 11,321,308 B2 | 5/2022 | Yan |
| 11,334,875 B2 | 5/2022 | Yantis et al. |
| 11,348,099 B2 | 5/2022 | Vijayan |
| 11,367,060 B1 | 6/2022 | Barbashin et al. |
| 11,501,297 B1 | 11/2022 | Tai et al. |
| 2006/0111188 A1* | 5/2006 | Winkler ............ G07F 17/32 705/1.1 |
| 2008/0120558 A1* | 5/2008 | Nathan ............ A63F 13/352 715/764 |
| 2011/0014985 A1* | 1/2011 | Park ............ A63F 13/60 463/43 |
| 2023/0119641 A1* | 4/2023 | Meyers ............ A63F 13/60 463/42 |
| 2023/0198760 A1* | 6/2023 | Ferenczi ............ H04L 9/0825 713/168 |
| 2023/0281940 A1* | 9/2023 | Shen ............ G06V 20/20 345/419 |
| 2023/0421551 A1* | 12/2023 | Hardjono ............ H04L 9/50 |
| 2024/0070660 A1* | 2/2024 | Milne ............ A63F 13/73 |
| 2024/0211910 A1* | 6/2024 | Lal ............ G06Q 40/04 |

\* cited by examiner

SYSTEM AND METHOD FOR VALIDATING A DIGITAL ITEM TOKEN ON A SIMULATED USER DEVICE

TECHNICAL FIELD

This disclosure relates generally to network communications and information security. More particularly, this disclosure relates to a system and method for validating a digital item token on a simulated user device.

BACKGROUND

An organization entity may provide different services at different physical locations within a network to allow users to view a list of items. Existing systems require users to submit credentials at the different physical locations each time to access the services in the network.

SUMMARY

The system and method described in the present disclosure provide practical applications and technical advantages that overcome the current technical problems described herein. Currently, when a user wants to access a list of digital item tokens, such as non-fungible tokens (NFTs), the user has to log into a real-world user device in the physical world. The provided systems and methods are integrated into the practical application of allowing the user to access a list of digital item tokens on a simulated device within the virtual environment. The provided systems and methods allow for an avatar associated with the user to view a digital item token as soon as it is acquired in the virtual environment. For example, the digital item token can be viewed on a simulated virtual device in the virtual environment itself in real-time, without having to switch to a real-world device to view the same. In some embodiments, the provided system and method include a virtual environment exchange server in communication with the simulated user device in the virtual environment. The virtual environment exchange server is configured to allow the user to view digital item tokens acquired from multiple virtual environments, which may occur in real-time. For example, a digital item token may be acquired in a second virtual environment, and the virtual environment exchange server is configured to allow an avatar associated with the user in the first virtual environment to view digital item tokens on the simulated virtual device as soon as it is acquired in the second virtual environment.

The disclosed system and method provide several practical applications and technical advantages. First, the disclosed system and method lead to the technical advantage of improving an efficiency of application services provided by an entity, and the technical advantage of improving the overall operations of the computing system. For example, the disclosed system and method allow for an avatar of the user to view digital item tokens on a simulated user device in a virtual environment, which may be viewed as soon as the digital item token is acquired in the virtual environment. By allowing the avatar of the user to view the digital item token in real-time within the virtual environment, it avoids having the user switch back to a real-world device to view the same. The disclosed system and method improves the user's access to information within the virtual environment. Second, the virtual-world exchange server improves the user's access to information across multiple virtual environments, thereby increasing the user's access to information within the virtual environment.

In some embodiments, the present disclosure provides a system. The system comprises a memory operable to store a data log of interactions performed by an avatar in a virtual environment, one or more known user credentials associated with a user a first digital item token associated with the virtual environment and a second digital item token associated with the virtual environment. The system comprises a processor operably coupled to the memory. The processor is configured to present a simulated user device in the virtual world, where the simulated user device is a computer simulation of a real-world user device in the virtual environment. The processor is configured to receive one or more user credentials associated with the user in response to the avatar interacting with the simulated user device in the virtual environment, and compare the one or more user credential associated with the user to the one or more known user credentials in the memory. The processor is configured to authenticate that the avatar is associated with the user based at least in part on the comparison, and in response, the processor is configured to identify a first prior interaction performed by the avatar in the virtual environment from the data log of interactions, where the first prior interaction is associated with the first digital item token. The processor is further configured to identify a second prior interaction performed by the avatar in the virtual environment from the data log of interactions, where the second prior interaction is associated with the second digital item token. The processor is configured to retrieve the first digital item token from the memory, retrieve the second digital item token from the memory; and present the first digital item token and the second digital item token on a display of the simulated user device in the virtual environment.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
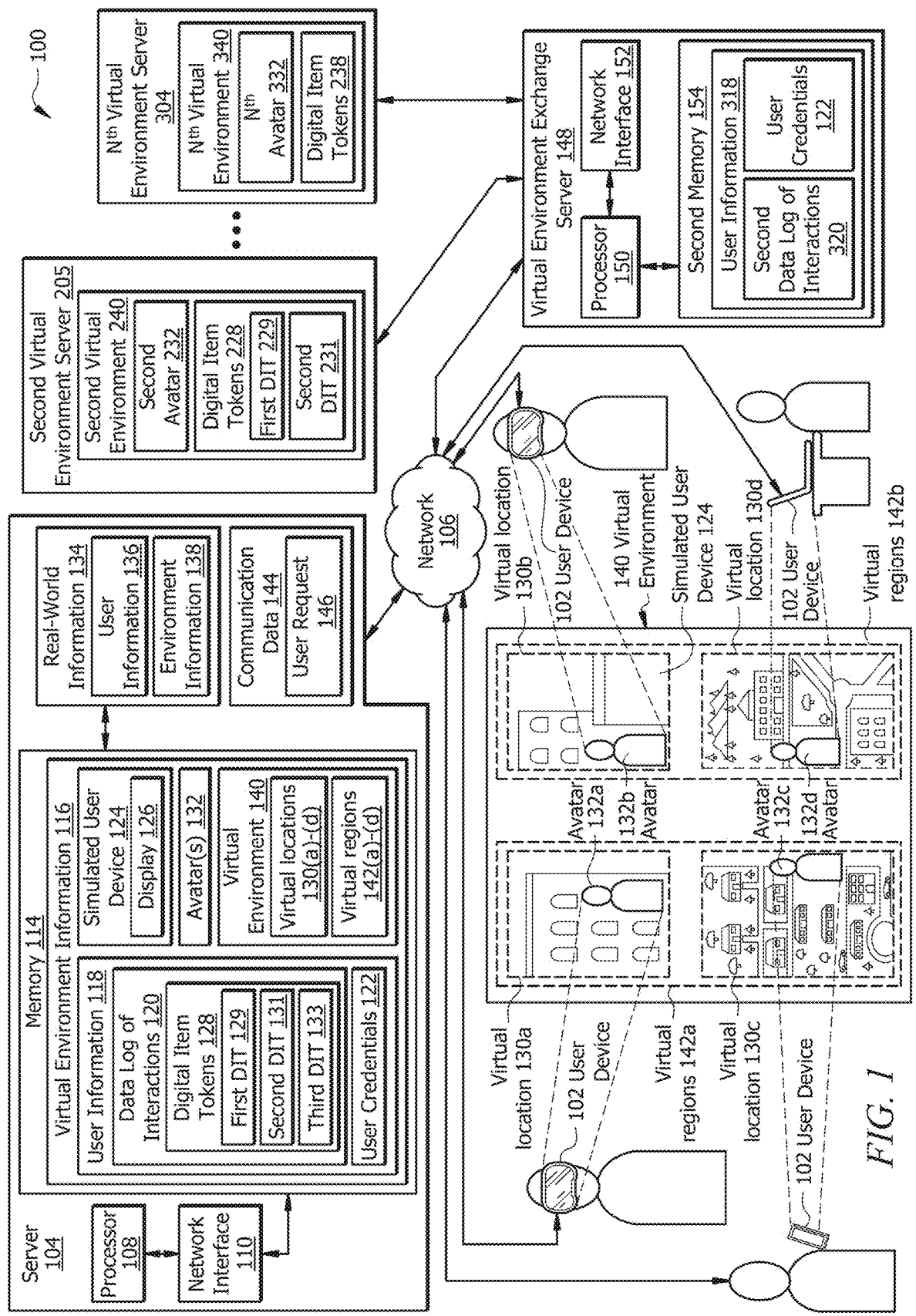
FIG. 1 illustrates a system according to an embodiment of the present disclosure.

As described above, when a user wants to access a list of digital item tokens, such as non-fungible tokens (NFTs), the user has to log into a real-world user device in the physical world. The provided systems and methods are integrated into the practical application of allowing the user to access a list of digital item tokens on a simulated device within the virtual environment. The provided systems and methods allow for an avatar associated with the user to view a digital item token as soon as it is acquired in the virtual environment. For example, the digital item token can be viewed on a simulated virtual device in the virtual environment itself in real-time, without having to switch to a real-world device to view the same.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth™ network, a Near Field Communication network, a Zigbee™ network, and/or any other suitable network. The network 106 may be configured to support any suitable type of communication protocol as would be appreciated by one of ordinary skill in the art.

User Device

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 140 to a user. Each user device 102 is further configured to allow a user to send a request for authenticating the user device 102 to access the virtual environment 140 and to interact with the server 104.

Each user device 102 is configured to display a two-dimensional (2D) or three-dimensional (3D) representation of a virtual environment 140 to a user. Examples of a virtual environment 140 include, but are not limited to, a graphical or virtual representation of a metaverse, a map, a city, a building interior, a landscape, a fictional location, an alternate reality, or any other suitable type of location or environment. A virtual environment 140 may be configured to use realistic or non-realistic physics for the motion of objects within the virtual environment 140. Within the virtual environment 140, each user may be associated with a user device 102 and an avatar 132(a)-(d). The avatar 132(a)-(d) is a graphical representation of the respective user device 102 and the user within the virtual environment 140. Examples of the avatars 132(a)-(d) include, but are not limited to, a person, an animal, or an object. In some embodiments, the features and characteristics of the avatar 132(a)-(d) may be customizable and user defined. For example, the size, shape, color, attire, accessories, or any other suitable type of appearance features may be specified by a user. By using the avatar 132(a)-(d), a user or the user device 102 can move within the virtual environment 140 to interact with one or more entities associated with the server 104 or other avatars 132(a)-(d) and objects within the virtual environment 140.

Figure 2:
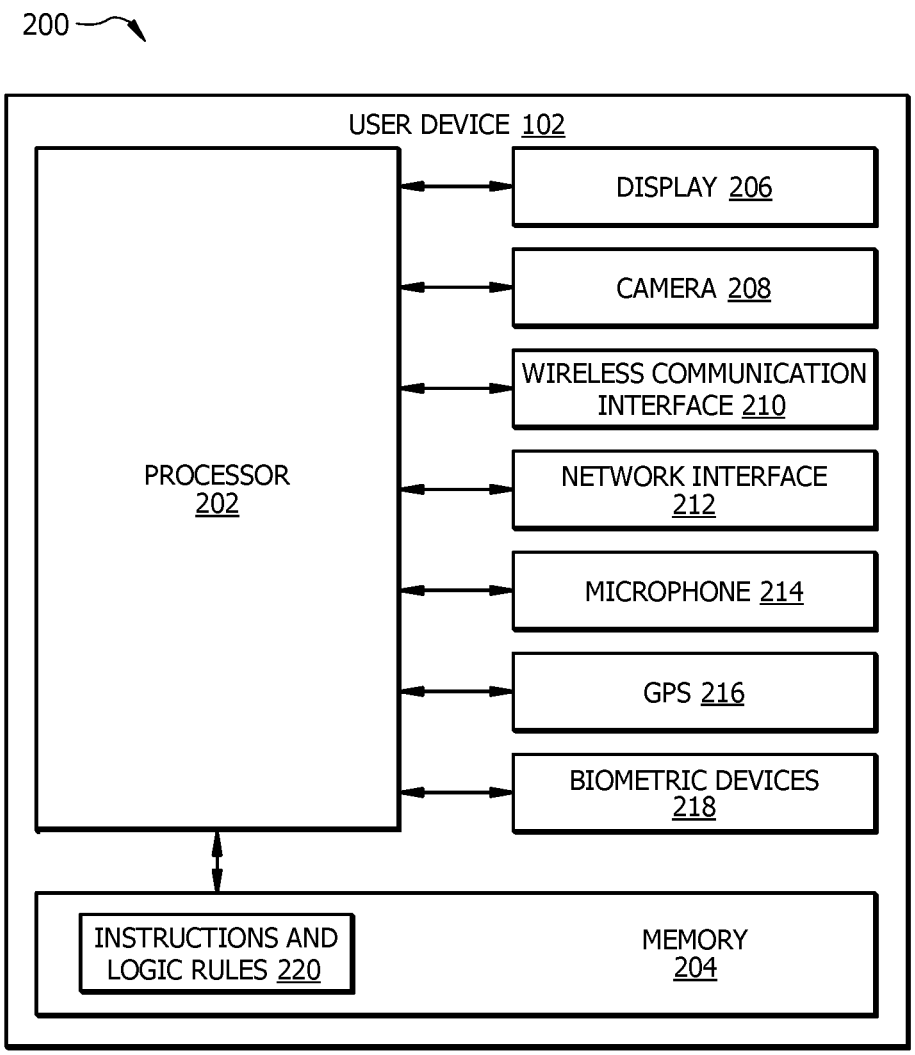
FIG. 2 is a block diagram of an example user device of the system of FIG. 1.

FIG. 2 is a block diagram of an embodiment of the user device 102 used by the system 100 of FIG. 1. The user device 102 may be configured to display the virtual environment 140 (referring to FIG. 1) within a field of view of the user (referring to FIG. 1), capture biometric, sensory, and/or physical information of the user wearing and operating the user device 102, and to facilitate an electronic interaction between the user and the server 104 (referring to FIG. 1).

The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

Figure 3:
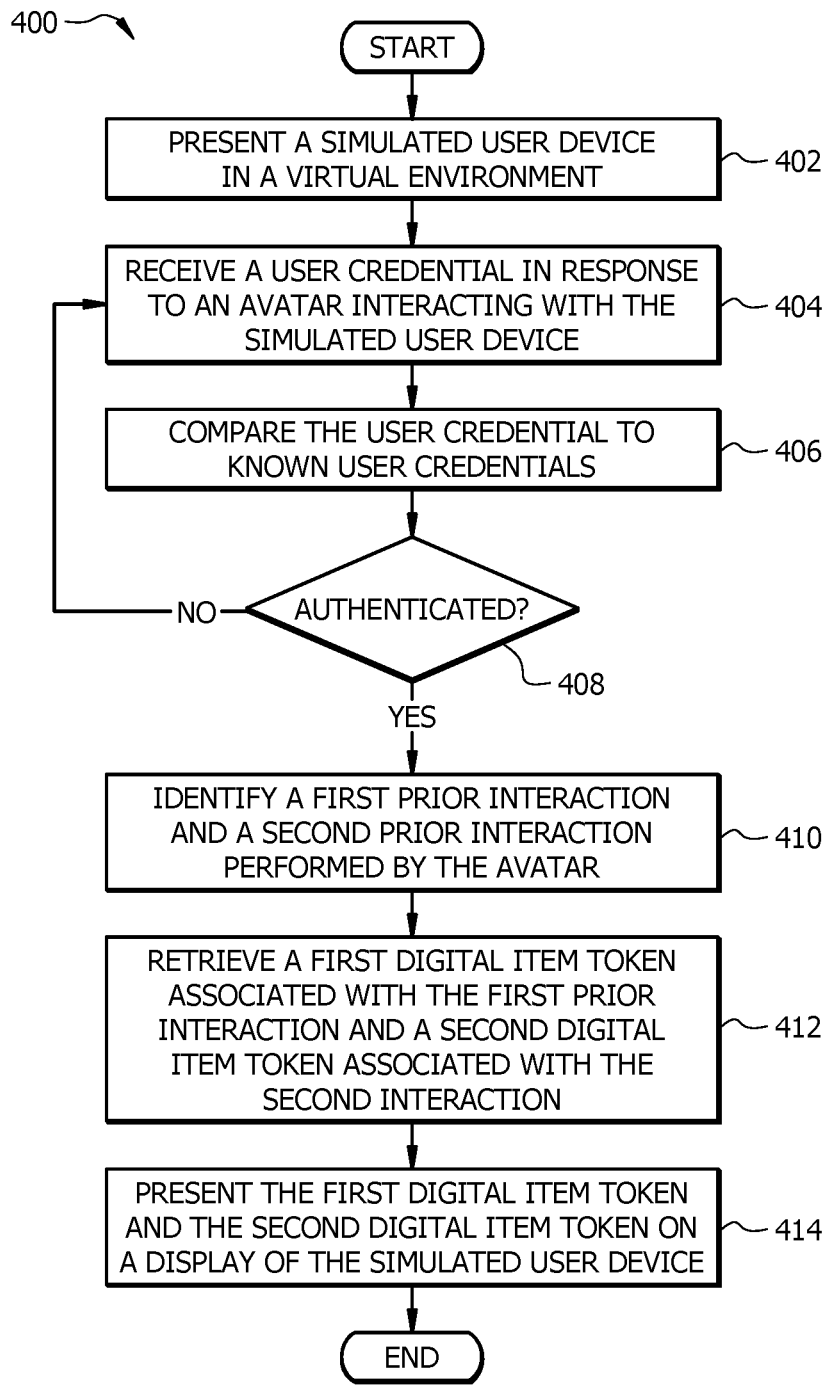
FIG. 3 illustrates a flowchart of one embodiment of a method of operating the system of FIG. 1.

The memory 204 is operable to store any of the information described with respect to FIGS. 1 and 3 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. For example, the memory 204 may store the instructions and logic rules 220, which are described below for performing the functions of user device 102 with respect to FIGS. 1 and 3.

Display 206 is configured to present visual information to the user (for example, user in FIG. 1) in an augmented reality environment that overlays virtual or graphical objects onto tangible objects in a real scene in real-time. In other embodiments, the display 206 is configured to present visual information to the user as the virtual environment 140 (referring to FIG. 1) in real-time. In an embodiment, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 140.

Camera 208 is configured to capture images of the user wearing the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Examples of wireless communication interface 210 include, but are not limited to, a Bluetooth™ interface, an RFID interface, a near field communication interface, a local area network interface, a personal area network interface, a wide area network interface, a Wi-Fi interface, a Zigbee™ interface, or any other suitable wireless communication interface as would be appreciated by one of ordinary skill in the art upon viewing this disclosure. Wireless communication interface 210 is configured to facilitate processor 202 in communicating with other devices. Wireless communication interface 210 is configured to employ any suitable communication protocol.

The network interface 212 is configured to enable wired and/or wireless communications. The network interface 212 is configured to communicate data between the user device 102 and other network devices, systems, or domain(s). For example, the network interface 212 may comprise a WIFI interface, a local area network interface, a wide area network interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from the user. Microphone 214 is communicably coupled to processor 202.

GPS sensor 216 is configured to capture and to provide geographical location information. For example, GPS sensor 216 is configured to provide a geographic location of the user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. Biometric device 218 is communicably coupled to processor 202.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. In particular embodiments, the server 104 may be implemented in the cloud or may be organized in either a centralized or distributed manner.

The server 104 comprises a processor 108 operably coupled with a network interface 110 and a memory 114. The processor 108 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 108 may be a programmable logic device, a microcontroller, a microprocessor, or any suitable number and combination of the preceding. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations. The processor 108 may register the supply operands to the ALU and store the results of ALU operations. The processor 108 may further include a control unit that fetches instructions from memory and executes them by directing the coordinated operations of the ALU, registers, and other components. The one or more processors are configured to implement various software instructions. In this way, processor 108 may be a special-purpose computer designed to implement the functions disclosed herein. In an embodiment, the processor 108 is implemented using logic units, FPGAs, ASICs, DSPs, or any other suitable hardware. The processor 108 is configured to operate the server 104 as described in FIGS. 1-3. For example, the processor 108 may be configured to perform one or more operations of the operational flow 300 as described in FIG. 2.

The network interface 110 configured to enable wired and/or wireless communications between the server 104 and the network 106, as well as other components in the system 100. Suitable network interfaces 110 include an NFC interface, a Bluetooth™ interface, a Zigbee™ interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 110 may be configured to use any suitable type of communication protocol as would be appreciated by one of ordinary skill in the art.

The memory 114 may be volatile or non-volatile and may comprise read-only memory (ROM), random-access memory (RAM), ternary content-addressable memory (TCAM), dynamic random-access memory (DRAM), and static random-access memory (SRAM). The memory 114 may include one or more of a local database, cloud database, network-attached storage (NAS), etc. The memory 114 comprises one or more disks, tape drives, or solid-state drives, and may be used as an over-flow data storage device, to store programs when such programs are selected for execution, and to store instructions and data that are read during program execution. The memory 114 may store any of the information described for the server 104 in FIGS. 1-3 along with any other data, instructions, logic, rules, or code operable to implement the function(s) described herein when executed by processor 108.

The memory 114 is operable to store virtual environment information 116 that includes user information 118, a data log of interactions 120 performed by the user in the virtual environment 140, one or more known user credentials 122, a simulated user device 124 having a display 126 for displaying one or more digital item tokens 128, virtual locations 130(a)-(d), avatars 132, and virtual regions 142(a)-(d). The memory 114 is operable to store real world information 134 that includes user information 136 and environment information 138. The memory 114 is operable to store communication data 144 that includes a user request 146.

The virtual environment information 116 comprises the user information 118. The user information 118 generally comprises information that is associated with user accounts that can be used within the virtual environment 140. For example, the user information 118 may comprise user profile information, online account information, digital assets information, or any other suitable type of information that is associated with the user within a virtual environment 140. In some embodiments, the user information 118 includes a data log of interactions 120 performed by the avatar 132 of the user in the virtual environment 140. The data log of interactions 120 may include prior interaction data associated with acquiring one or more digital asset in the virtual environment 140, such as one or more digital item token 128. In some embodiments, the digital item token 128 is a non-fungible token (NFT) associated with a digital asset in the virtual environment 140. The NFT may be associated with any digital asset including, but not limited to, digital currency, digital art, music, film, a virtual item in the virtual environment 140, virtual real estate in the virtual environment 140, etc. In one example, the data log of interactions 120 may include data associated with a first prior interaction performed by the avatar 132 in the virtual environment 140 that included acquiring a first digital item token 129. The data log of interactions 120 may include data associated with a second prior in a second prior interaction performed by the avatar 132 in the virtual environment 140 that included acquiring a second digital item token 131. Any number of prior interactions and data associated therewith may be stored in the data log of interactions 120. In some embodiments, the server 104 may update the data log of interactions 120 to include real-time interactions performed by the avatar 132 within the virtual environment 140. For example, the processor 108 may receive data associated with a third interaction performed by the avatar 132 of the user in the virtual environment 140, where the third interaction includes acquiring a third digital item token 133. The processor 108 may update the data log of interactions 120 to store data associated with the third digital item token 133, which may occur in real-time (e.g., as soon as the avatar 132 acquires the digital asset in the virtual environment 140). In some embodiments, the user information 118 includes one or more user credentials 122 associated with a user account for a user device to access a virtual environment 140. The known user credential 122 may comprise login information, such as one or more of user identifiers, username, physical address, email address, phone number, passwords, biometric information associated with the user, and any other data associated with the user account, such as documents, files, media items, etc.

The virtual environment information 116 generally comprises information or data about the appearance of the virtual environment 140. For example, the virtual environment 140 may comprise information associated with objects, landmarks, buildings, structures, virtual locations 130(a)-(d), virtual regions 142(a)-(d), or any other suitable type of element that is present within a virtual environment 140. In some embodiments, the virtual environment information 116 may be used to create a representation of a virtual environment 140 for users. In this case, a virtual environment 140 may be implemented using any suitable type of software framework or engine.

Examples of a virtual environment 140 include, but are not limited to, a graphical or virtual representation of a metaverse, a map, a city, a building interior, a landscape, a fictional location, an alternate reality, or any other suitable type of location or environment. A virtual environment 140 may be configured to use realistic or non-realistic physics for the motion of objects within the virtual environment 140. For example, some virtual environment 140 may be configured to use gravity whereas other virtual environment 140 may not be configured to use gravity.

The virtual environment information 116 generally comprises information or data bout the appearance of the simulated user device 124. The simulated user device 124 is a computer simulation of a real-world user device in the virtual environment 140. The appearance of the simulated user device 124 in the virtual environment 140 may present as any user device including, but not limited to a mobile phone, a smart phone, an electronic tablet device, a computer (e.g., personal computer, desktop, workstation, laptop), and an automated teller machine (ATM). In some embodiments, the simulated user device 124 includes a display 126 configured for displaying digital item tokens 128 received from the data log of interactions 120. In some embodiments, the simulated user device 124 may be implemented using any suitable type of software framework or engine.

The real-world information 134 comprises user information 136 and environment information 138. The user information 136 generally comprises information that is associated with user profiles and user accounts that can be used within the real world. For example, user information 136 may comprise user profile information, account information, or any other suitable type of information that is associated with a user within a real-world environment. The user profile comprises one or more known user credentials 122 (e.g., login information) associated with a user account for a user device to access and interact with systems or platforms associated with one or more entities or sub-entities in a physical environment. The environment information 138 generally comprises information that is associated with an entity within the real world that the user is a member of or is associated with. For example, the environment information 138 may comprise physical addresses, GPS based locations, phone numbers, email addresses, contact names, or any other suitable type of information that is associated with one or more entities. Since the server 104 has access to both the virtual environment information 116 and the real-world information 134, the server 104 may link the virtual environment information 116 and the real-world information 134 together for a user such that changes to the virtual environment information 116 affect or propagate to the real-world information 134 and vice-versa. For example, one or more user login credentials 122 associated with a user account for a user device to access the virtual environment 140 are also used for the user device to access and interact with the systems or platforms associated with one or more entities or sub-entities in a physical environment. The server 104 may be configured to store one or more maps that translate or convert different types of interactions between the real world and the virtual environment 140 and vice-versa.

The server 104 may generate a virtual environment 140 based on the virtual environment information 116 and the real-world information 134. The virtual environment 140 may be a graphical or virtual representation of a metaverse, a map, a city, a building interior, a landscape, a fictional location, an alternate reality, or any other suitable type of location or environment. As illustrated in FIG. 1, the virtual environment 140 comprises a plurality of virtual locations 130 (e.g., 130a-130d) associated with corresponding virtual regions 142 (e.g., 142a and 142b) and geographical regions. Each virtual location 130 in the virtual environment is associated with at least one entity which operates and provides services in a geographical region in the real-world environment through the network 106. In one embodiment, each virtual location 130 may be configured and executed by the processor 108 to provide one or more services provided by an entity in a geographical region in the real-world environment. The server 104 may be configured to store one or more maps executed by the processor 108 that translate or convert different types of interactions occurred in the virtual environment 140 between the real world and the virtual environment 140 and vice-versa.

Within the virtual environment 140, an avatar 132 is generated by the processor 108 as a graphical representation of a user device 102 within the virtual environment 140. The avatar 132 is associated with corresponding user information 118 which may include one or more user identifiers, username, physical address, passwords, biometric data associated with the user, email address, phone number, documents associated with a user account and an entity. The avatar 132 includes a plurality of features and characteristics which are processed by the processor 108 to present the avatar 132 as the graphical representation of the user device 102 in the virtual environment 140. For example, the server 104 may receive a signal indicating a physical location of the user device 102 and/or detect the user device 102 in the real-world environment. The server 104 may store the received signal in the memory 114. The server 104 may determine a virtual location of an avatar 132 associated with the user device 102 in the virtual environment 140 based on the physical location of the user device 102.

The server 104 may authorize a user device 102 to access the virtual environment 140 to interact with one or more entities at different virtual locations through the server 104. In an example operation, the server 104 may receive incoming communication data 144 that includes a user request 146 from the avatar 132 through the user device 102 for accessing the virtual environment 140 via the network 106. The server 104 may receive one or more user credential and authorize the avatar 132 associated with the user device 102 to enter the virtual environment 140. For example, the server 104 may compare the one or more user credential to known user credentials 122 in the user profile. If they match, the server 104 may authorize the avatar 132 associated with the user device 102 to enter the virtual environment 140.

Virtual Environment Exchange Server

In some embodiments, the system 100 includes a virtual environment exchange server 148 in communication with the server 104 via the network 106. The virtual environment exchange server 148 is configured to communicate data and information between the server 104 and a second virtual environment server 205 that hosts a second virtual environment 240. The virtual environment exchange server 148 may communicate data and information between the server 104 and any number of virtual environment servers (e.g., up to an $N^{th}$ virtual environment server 304 that hosts an $N^{th}$ virtual environment 340). In general, the virtual environment exchange server 148 allows the avatar 132 of the user in the virtual environment 140 to view digital item tokens 228, 328 that were acquired by avatars 232, 332 associated with the user on different virtual environments hosted by different virtual environment servers (e.g., a second virtual environment 240 hosted by a second virtual environment server 205 to an $N^{th}$ virtual environment 340 hosted by an $N^{th}$ virtual environment server 304). The virtual-environment exchange server 148 may update the data log of interactions 120 on the server 104 to include digital item tokens 228 from the second virtual environment 240 and/or the digital item tokens 328 from the $N^{th}$ virtual environment 340. This advantageously allows the avatar 132 of the user in the virtual environment 140 to view assets the user has acquired across multiple virtual environments within a single virtual environment, and avoids having the user login to the other virtual environments to check on the digital assets.

The virtual environment exchange server 148 includes a processor 150 operably coupled with a network interface 152 and a memory 154. The processor 150 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 150 may be a programmable logic device, a microcontroller, a microprocessor, or any suitable number and combination of the preceding. The one or more processors are configured to process data and may be implemented in hardware or software. For example, the processor 150 may be 8-bit, 16-bit, 32-bit, 64-bit, or of any other suitable architecture. The processor 150 may include an arithmetic logic unit (ALU) for performing arithmetic and logic operations. The processor 150 may register the supply operands to the ALU and store the results of ALU operations. The processor 150 may further include a control unit that fetches instructions from memory and executes them by directing the coordinated operations of the ALU, registers, and other components. The one or more processors are configured to implement various software instructions. In this way, processor 150 may be a special-purpose computer designed to implement the functions disclosed herein. In an embodiment, the processor 150 is implemented using logic units, FPGAs, ASICs, DSPs, or any other suitable hardware. The processor 150 is configured to operate as described in FIGS. 1-3. For example, the processor 150 may be configured to perform one or more operations of the operational flow 300 as described in FIG. 3.

The network interface 152 configured to enable wired and/or wireless communications between the virtual environment exchange server 148, the second virtual environment server 205, the $N^{th}$ virtual environment server 304 and the network 106. Suitable network interfaces 152 include an NFC interface, a Bluetooth™ interface, a Zigbee™ interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 152 may be configured to use any suitable type of communication protocol as would be appreciated by one of ordinary skill in the art.

The memory 154 may be volatile or non-volatile and may comprise read-only memory (ROM), random-access memory (RAM), ternary content-addressable memory (TCAM), dynamic random-access memory (DRAM), and static random-access memory (SRAM). The memory 154 may include one or more of a local database, cloud database, network-attached storage (NAS), etc. The memory 154 comprises one or more disks, tape drives, or solid-state drives, and may be used as an over-flow data storage device, to store programs when such programs are selected for execution, and to store instructions and data that are read during program execution. The memory 154 may store any of the information described in FIGS. 1-3 along with any other data, instructions, logic, rules, or code operable to implement the function(s) described herein when executed by processor 150.

The memory may store user information 318 that is associated with user accounts that can be used within the second virtual environment 240 and the $N^{th}$ virtual environment 340. For example, the user information 318 may comprise user profile information, online account information, digital assets information, or any other suitable type of information that is associated with the user within the second virtual environment 240 and the $N^{th}$ virtual environment 340. In some embodiments, the user information 318 includes a data log of interactions 320 performed by the avatars 232, 323 of the user within the second virtual environment 240 and the $N^{th}$ virtual environment 340. The data log of interactions 320 may include prior interaction data associated with acquiring one or more digital asset in the second virtual environment 240 and the $N^{th}$ virtual environment 340, such as one or more digital item token 228, 328. In some embodiments, the virtual environment exchange server 148 may update the data log of interactions 120 of the virtual environment 140 to include one or more digital item token 228, 328. In some embodiments, the user information 318 includes one or more known user credentials 122 associated with a user account for a user device 102 to access in the second virtual environment 240 and the $N^{th}$ virtual environment 340. The known user credential 122 may comprise login information, such as one or more of user identifiers, username, physical address, email address, phone number, passwords, biometric information associated with the user, and any other data associated with the user account, such as documents, files, media items, etc.

System Operation

FIG. 3 illustrates one embodiment of a flowchart 400 for presenting one or more digital item tokens 128 to an avatar 132 of a user on a simulated user device 124 in a virtual environment 140. The operational flow 400 can be logically described in two parts. The first part includes presenting a simulated user device 124 in a virtual environment 140, receiving one or more user credential in response to an avatar 132 interacting with the simulated user device 124 in the virtual environment 140, and comparing the one or more user credential to one or more known user credential 122 in the memory 114 of the server 104 to determine whether the avatar 132 is associated with the user based at least in part on the comparison. If the user is authorized, the operational flow proceeds to the second part. The second part includes identifying a first prior interaction performed by the avatar 132 in the virtual environment 140 from a data log of interactions 120, identifying a second prior interaction performed by the avatar in the virtual environment 140 from the data log of interactions 120, retrieving a first digital item token 129 associated with the first prior interaction from the data log of interactions 120, retrieving a second digital item token 131 associated with the second prior interaction from the data log of interactions 120, and presenting the first digital item token 129 and the second digital item token 131 on the display 126 of the simulated user device 124 in the virtual environment 140.

In operation, the flow 400 may begin at operation 402 where the processor 108 of the server 104 is configured to present the simulated user device 124 in the virtual environment 140. The simulated user device 124 is a computer simulation of a real-world user device in the virtual environment 140. The appearance of the simulated user device 124 in the virtual environment 140 may present as any user device including, but not limited to a mobile phone, a smart phone, an electronic tablet device, a computer (e.g., personal computer, desktop, workstation, laptop), and an automated teller machine (ATM). In some embodiments, the simulated user device 124 may be presented in the virtual environment 140 by the processor 108 using any suitable type of software framework or engine.

At operation 404, the processor 108 receives one or more user credential in response to the avatar 132 interaction with the simulated user device 124 in the virtual environment 140. For example, the avatar 132 of the user may approach the simulated user device 124 in the virtual environment 140 and enter one or more user credential, such as a username and password, in attempts to login to the simulated user device 124. At operation 406, the processor 108 compares the one or more user credentials provided by the avatar 132 to the known user credentials 122 stored in the memory 114. At decision block 408, the processor 108 may determine whether the avatar 132 authorized to access the simulated user device 124 based on the comparison in operation 406. If the one or more user credential provided by the avatar 132 do not match the known user credentials 122, then operational flow 400 returns to operation 404 where the avatar 132 is prompted to re-enter the one or more user credentials. If the one ore more user credentials provided by the avatar 132 match the known user credentials 12, then operational flow 400 proceeds to operation 410.

At operation 410, the processor 108 identifies a first prior interaction performed by the avatar 132 in the virtual environment 140 that includes a first digital item token 129, and the processor 108 further identifies a second prior interaction performed by the avatar 132 in the virtual environment 140 that includes a second digital item token 131. The prior interactions may be identified from the data log of interactions 120 by the processor 108. In some embodiments, the first prior interaction and second prior interaction performed by the avatar 132 in the virtual environment 140 may include a previous action where the avatar 132 acquired (e.g., purchased) the first digital item token 129 and the second digital item token 131 in the virtual environment 140. In some embodiments, the digital item token 128 is a non-fungible token (NFT) associated with a digital asset in the virtual environment 140. The NFT may be associated with any digital asset including, but not limited to, digital currency, digital art, music, film, a virtual item in the virtual environment 140, and virtual real estate in the virtual environment 140.

At operation 412, the processor 108 retrieves the first digital item token 129 associated with the first prior interaction and further retrieves the second digital item token 131 associated with the second prior interaction from the data log of interactions 120. The processor 108 is further configured to communicate the first digital item token 129 and the second digital item token 131 to the simulated user device 124. At operation 414, the processor 108 is configured to present the first digital item token 129 and the second digital item token 131 on the display 126 of the simulated user device 124 in the virtual environment 140 to the avatar 132 of the user. In one exemplary use case, the simulated user device 124 may be an automated teller machine that is configured to display the one or more digital item tokens 128 associated with the user within the virtual environment 140.

In some embodiments, the processor 108 may update the data log of interactions 120 to include real-time interactions performed by the avatar 132 within the virtual environment 140. For example, the processor 108 may receive data associated with a third interaction performed by the avatar 132 of the user in the virtual environment 140, where the third interaction includes acquiring a third digital item token 133. The processor 108 may update the data log of interactions 120 to store data associated with the third digital item token 133, which may occur in real-time (e.g., as soon as the avatar 132 acquires the digital asset in the virtual environment 140). In some embodiments, operation 410 may further include identifying a third interaction in the data log of interactions 120. The third interaction may be updated in the data log of interactions 120 in real time (e.g., occurred during a current session while the avatar 132 is active in the virtual environment 140). In other words, the third interaction may appear in the data log of interactions 120 without having the user log out of the virtual environment 140 and relog back in as the avatar 132. Operation 412 may further include having the processor 108 retrieve the third digital item token 133 from the data log of interactions 120, and operation 414 may further include presenting the third digital item token 133 on a display 126 of the simulated user device 124 in the virtual environment.

In some embodiments, at operation 410, the processor 108 is further configured to identify a prior interaction performed by a second avatar 232 associated with the user in the second virtual environment 240, where the prior interaction is associated with a first digital item token 229 from the second virtual environment 240. In some embodiments, the prior interaction from the second virtual environment and the associated first digital item token 229 may be stored in a second data log of interactions 320 a second memory 154 of the virtual environment exchange server 148. At operation 412, the processor 108 is further configured to retrieve the digital item token 228 associated with the second virtual environment 240 from the second memory 154 of the virtual environment exchange server 148, and communicate the digital item token 228 to the simulated user device 124. In some embodiments, operation 412 includes updating the data log of interactions 120 in the virtual environment 140 to include the digital item token 228 from the second virtual environment 240. In some embodiments, operation 414 further includes presenting the digital item token 228 on the display 126 of the simulated user device 124 in the virtual environment 140.

In some embodiments, the processor 150 of the virtual environment exchange server 148 may receive data associated with a second interaction performed by the second avatar 232 performed in the second virtual environment 240, where the second interaction includes a second digital item token 231. The processor 150 of the virtual environment exchange server 148 may communicate the second interaction including the second digital item token 231 to the server 104, and update the data log of interactions 120 to include the second digital item token 231 from the second virtual environment 240. The processor 108 may then retrieve the second digital item token 231 of the second virtual environment from the memory 114 and present the second digital item token 231 of the second virtual environment on the display 126 of the simulated user device 124 in the virtual environment 140.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operable to store a data log of interactions performed by an avatar in a virtual environment, one or more user credentials associated with a user, a first digital item token associated with the virtual environment, and a second digital item token associated with the virtual environment; and
   a processor operably coupled to the memory and configured to:
   present a simulated user device in the virtual environment, wherein the simulated user device is a computer simulation of a real-world user device in the virtual environment;
   receive one or more user credentials in response to the avatar interacting with the simulated user device in the virtual environment;
   compare the one or more user credentials to one or more known user credentials stored in the memory;
   determine that the avatar is associated with the user based at least in part on the comparison, and in response:
   activate a first communication session between the avatar and the virtual environment;
   identify a first prior interaction performed by the avatar in the virtual environment from the data log of interactions, wherein the first prior interaction is associated with the first digital item token;
   identify a second prior interaction performed by the avatar in the virtual environment from the data log of interactions, wherein the second prior interaction is associated with the second digital item token;
retrieve the first digital item token from the memory;
retrieve the second digital item token from the memory; and
present the first digital item token and the second digital item token on display of the simulated user device in the virtual environment;
a virtual environment exchange server, comprising:
a second memory operable to store a second data log of interactions performed by a second avatar associated with the user in a second virtual environment, the second data log of interactions including a third digital item token associated with the second virtual environment; and
a second processor configured to:
activate a second communication session between the second avatar and the second virtual environment;
update the data log of interactions based on the second data log of interactions, wherein the data log of interactions is updated to include the third digital item token associated with the second virtual environment while both the first communication session and the second communication session continue to remain active;
retrieve the first digital item token, the second digital item token, and the third digital item token from the updated data log of interactions while the second communication session is active; and
present, over the first communication session, the first digital item token, the second digital item token, and the third digital item token on the display of the simulated user device in the virtual environment while the first communication session and the second communication session continue to remain active;
a second virtual environment server, comprising:
a third memory operable to store a third data log of interactions performed by a third avatar associated with the user in a third virtual environment, the third data log of interactions including a fourth digital item token associated with the third virtual environment; and
a third processor configured to:
activate a third communication session between the third avatar and the third virtual environment;
re-update the data log of interactions based on the third data log of interactions, wherein the data log of interactions is re-updated to include the fourth digital item token associated with the third virtual environment while both the first communication session, the second communication session, and third communication session continue to remain active;
the second processor of the virtual environment exchange server is further configured to:
retrieve the third digital item token and the fourth digital item token from the re-updated data log of interactions over the active first communication session; and
present, over the active first communication session, the third digital item token and the fourth digital item token on the display of the simulated user device in the virtual environment while the second communication session and the third communication session continue to remain active.

2. The system of claim 1, wherein each of the first digital item token and the second digital item token comprises a non-fungible token associated with a digital asset in the virtual environment.

3. The system of claim 1, wherein the simulated user device is an automated teller machine in the virtual environment.

4. The system of claim 1, wherein the one or more user credentials comprise one or more of a username, a password, or biometric information associated with the user.

5. The system of claim 1, wherein the virtual environment is a first metaverse, the second virtual environment is a second metaverse, and the third virtual environment is a third metaverse.

6. The system of claim 1 further comprising:
identify a prior interaction performed by the second avatar in the second virtual environment from the second data log of interactions, wherein the prior interaction is associated with the third digital item token associated with the second virtual environment;
retrieve the third digital item token associated with the second virtual environment from the second memory; and
present the third digital item token associated with the second virtual environment on the display of the simulated user device in the second virtual environment.

7. The system of claim 6, wherein the processor is configured to:
receive data associated with a second interaction performed by the second avatar in the second virtual environment, wherein the second interaction is associated with a fifth digital item token of the second virtual environment;
store the second interaction performed by the second avatar in the data log of interactions in the memory;
retrieve the fifth digital item token of the second virtual environment from the memory; and
present the fifth digital item token of the second virtual environment on the display of the simulated user device in the virtual environment.

8. A method comprising:
presenting a simulated user device in a virtual environment, wherein the simulated user device is a computer simulation of a real-world user device in the virtual environment;
receiving one or more user credentials associated with a user in response to an avatar interacting with the simulated user device in the virtual environment;
comparing the one or more user credentials associated with the user to one or more known user credentials stored in a memory;
determining that the avatar is associated with the user based at least in part on the comparison, and in response:
activating a first communication session between the avatar and the virtual environment;
identifying a first prior interaction performed by the avatar in the virtual environment from a data log of interactions stored in the memory, wherein the first prior interaction is associated with a first digital item token;
identifying a second prior interaction performed by the avatar in the virtual environment from the data log of interactions, wherein the second prior interaction is associated with a second digital item token;

retrieving the first digital item token from the memory;
retrieving the second digital item token from the memory; and
presenting the first digital item token and the second digital item token on a display of the simulated user device in the virtual environment;
receiving, from a virtual environment exchange server, a second data log of interactions performed by a second avatar associated with the user in a second virtual environment, the second data log of interactions including a third digital item token associated with the second virtual environment;
activating, by the virtual environment exchange server, a second communication session between the second avatar and the second virtual environment;
updating, by the virtual environment exchange server, the data log of interactions based on the second data log of interactions, wherein the data log of interactions is updated to include the third digital item token associated with the second virtual environment while both the first communication session and the second communication session continue to remain active;
retrieving the first digital item token, the second digital item token, and the third digital item token from the updated data log of interactions while the second communication session is active; and
presenting, over the first communication session, the first digital item token, the second digital item token, and the third digital item token on the display of the simulated user device in the virtual environment while the first communication session and the second communication session continue to remain active;
receiving, from a second virtual environment server, a third data log of interactions performed by a third avatar associated with the user in a third virtual environment, the third data log of interactions including a fourth digital item token associated with the third virtual environment;
activating, by the second virtual environment server, a third communication session between the third avatar and the third virtual environment;
re-updating, by the second virtual environment server, the data log of interactions based on the third data log of interactions, wherein the data log of interactions is re-updated to include the fourth digital item token associated with the third virtual environment while both the first communication session, the second communication session, and third communication session continue to remain active;
retrieving, by the virtual environment exchange server, the third digital item token and the fourth digital item token from the re-updated data log of interactions over the active first communication session; and
presenting, by the virtual environment exchange server, over the active first communication session, the third digital item token and the fourth digital item token on the display of the simulated user device in the virtual environment while the second communication session and the third communication session continue to remain active.

9. The method of claim 8, wherein each of the first digital item token and the second digital item token comprises a non-fungible token associated with a digital asset in the virtual environment.

10. The method of claim 8, wherein the simulated user device is an automated teller machine in the virtual environment.

11. The method of claim 8, wherein the one or more user credentials comprises one or more of a username, a password, or biometric information associated with the user.

12. The method of claim 8 wherein the virtual environment is a first metaverse, the second virtual environment is a second metaverse, and the third virtual environment is a third metaverse.

13. The method of claim 8 further comprising:
retrieving the third digital item token associated with the second virtual environment from the virtual environment exchange server; and
presenting the third digital item token associated with the second virtual environment on the display of the simulated user device in the second virtual environment.

14. The method of claim 13 further comprising:
receiving, using the virtual environment exchange server, data associated with a second interaction performed by the second avatar in the second virtual environment, wherein the second interaction is associated with a fifth digital item token of the second virtual environment;
storing the second interaction performed by the second avatar in the data log of interactions in the memory;
retrieving the fifth digital item token of the second virtual environment from the memory; and
presenting the fifth digital item token of the second virtual environment on the display of the simulated user device in the virtual environment.

15. A non-transitory computer-readable medium storing instructions that when executed by a processor cause the processor to:
present a simulated user device in a virtual environment, wherein the simulated user device is a computer simulation of a real-world user device in the virtual environment;
receive one or more user credentials associated with a user in response to an avatar interacting with the simulated user device in the virtual environment;
compare the one or more user credentials associated with the user to one or more known user credentials stored in a memory;
determine that the avatar is associated with the user based at least in part on the comparison, and in response:
  activate a first communication session between the avatar and the virtual environment;
  identify a first prior interaction performed by the avatar in the virtual environment from a data log of interactions stored in the memory, wherein the first prior interaction is associated with a first digital item token;
  identify a second prior interaction performed by the avatar in the virtual environment from the data log of interactions, wherein the second prior interaction is associated with a second digital item token;
  retrieve the first digital item token from the memory;
  retrieve the second digital item token from the memory; and
  present the first digital item token and the second digital item token on a display of the simulated user device in the virtual environment;
a second processor configured to:
  receive a second data log of interactions performed by a second avatar associated with the user in a second virtual environment, the second data log of interactions including a third digital item token associated with the second virtual environment;
  activate a second communication session between the second avatar and the second virtual environment;

update the data log of interactions based on the second data log of interactions, wherein the data log of interactions is updated to include the third digital item token associated with the second virtual environment while both the first communication session and the second communication session continue to remain active;

retrieve the first digital item token, the second digital item token, and the third digital item token from the updated data log of interactions while the second communication session is active; and present, over the first communication session, the first digital item token, the second digital item token, and the third digital item token on the display of the simulated user device in the virtual environment while the first communication session and the second communication session continue to remain active;

receive a third data log of interactions performed by a third avatar associated with the user in a third virtual environment, the third data log of interactions including a fourth digital item token associated with the third virtual environment;

activate a third communication session between the third avatar and the third virtual environment;

re-update the data log of interactions based on the third data log of interactions, wherein the data log of interactions is re-updated to include the fourth digital item token associated with the third virtual environment while both the first communication session, the second communication session, and third communication session continue to remain active;

retrieve the third digital item token and the fourth digital item token from the re-updated data log of interactions over the active first communication session; and present, over the active first communication session, the third digital item token and the fourth digital item token on the display of the simulated user device in the virtual environment while the second communication session and the third communication session continue to remain active.

16. The non-transitory computer-readable medium of claim 15, wherein each of the first digital item token and the second digital item token comprises a non-fungible token associated with a digital assent in the virtual environment.

17. The non-transitory computer-readable medium of claim 15, wherein the simulated user device is an automated teller machine in the virtual environment.

18. The non-transitory computer-readable medium of claim 15, wherein the one or more user credentials comprises one or more of a username, a password, or biometric information associated with the user.

19. The non-transitory computer-readable medium of claim 15, wherein the virtual environment is a first metaverse, the second virtual environment is a second metaverse, and the third virtual environment is a third metaverse.

20. The non-transitory computer-readable medium of claim 19, wherein the instructions further cause the processor to:

retrieve the third digital item token associated with the second virtual environment from the virtual environment exchange server; and present the third digital item token associated from the second virtual environment on the display of the simulated user device in the second virtual environment.

* * * * *